United States Patent
Lin et al.

(10) Patent No.: US 11,138,439 B1
(45) Date of Patent: Oct. 5, 2021

(54) SYSTEMS AND METHODS FOR DETECTING PATTERNS WITHIN VIDEO CONTENT

(71) Applicant: Honeywell International Inc., Morris Plains, NJ (US)

(72) Inventors: Yunting Lin, White Plains, NY (US); Tomas Brodsky, Cortlandt Manor, NY (US); Vit Libal, Prague (CZ)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/863,352

(22) Filed: Apr. 30, 2020

(51) Int. Cl.
*G06K 9/00* (2006.01)
*G06K 9/46* (2006.01)
*G06T 7/246* (2017.01)

(52) U.S. Cl.
CPC ..... *G06K 9/00744* (2013.01); *G06K 9/00718* (2013.01); *G06K 9/4604* (2013.01); *G06T 7/248* (2017.01); *G06K 2009/00738* (2013.01)

(58) Field of Classification Search
CPC ............ G06K 9/00744; G06K 9/4604; G06K 9/00718; G06K 2009/00738; G06T 7/248
See application file for complete search history.

(56) References Cited

U.S. PATENT DOCUMENTS

| | | | |
|---|---|---|---|
| 6,028,626 A | 2/2000 | Aviv | |
| 7,908,237 B2 | 3/2011 | Angell et al. | |
| 8,167,430 B2 | 5/2012 | Cobb et al. | |
| 9,396,400 B1* | 7/2016 | Teichman | G06K 9/6218 |
| 2004/0225627 A1 | 11/2004 | Botros et al. | |
| 2009/0244291 A1* | 10/2009 | Saptharishi | H04N 5/23293 348/187 |
| 2010/0162286 A1 | 6/2010 | Berry | |

(Continued)

OTHER PUBLICATIONS

Sandhan et al; "Unsupervised Learning Approach for Abnormal Event Detection in Survellance Video by Revealing Infrequent Patterns", IEEE, 28th International Conference on Image & Vision Computing New Zealand, pp. 494-499, 2013.

(Continued)

*Primary Examiner* — Dhaval V Patel
(74) *Attorney, Agent, or Firm* — Seager, Tufte & Wickhem, LLP (57) ABSTRACT

A method of reducing false positives and identifying relevant true alerts in a video management system includes analyzing images to look for patterns indicating changes between subsequent images. When a pattern indicating changes between subsequent images is found, the video management system solicits from a user an indication of whether the pattern belongs to one of two or more predefined categories. The patterns indicating changes between subsequent images are saved for subsequent use. Subsequent images received from the video camera are analyzed to look for patterns indicating changes between subsequent images. When a pattern indicating changes between subsequent images is detected by the video management system, the video management system compares the pattern indicating changes between subsequent images to those previously categorized into one of the two or more predefined categories. Based on the comparison, the video management system may provide an alert to the user.

20 Claims, 7 Drawing Sheets

(56) References Cited

U.S. PATENT DOCUMENTS

2019/0221090 A1* 7/2019 Beiser .................. G06K 9/6274

OTHER PUBLICATIONS

"Deep Learning," Hikvision Care Technology, 4 pages, accessed on Jun. 25, 2019.
"Deeper Intelligence, Deeper Surveillance, Hikvision Deep Learning Solution," Hikvision, 18 pages, 2017.
Farooq et al; "Unsupervised Video Surveillance for Anomaly Detection of Street Traffic", International Journal of Advanced Computer Science and Applications, Volume No. 12, pp. 270-275, 2017.
Feature Article: "How Deep Learning Benefits the Security Industry," Hikvision, 3 pages, Jun. 9, 2017, Accessed Jun. 25, 2019.
"Intelligent Video Analytics Solutions," Briefcam, 4 pages, 2019, Accessed on Jun. 25, 2019.
"Briefcam Helps Increase Security and Improve Operations in Leading US Hospital" (Massachusetts General Hospital) Briefcam, 2 pages, 2018.
Noceti et al; "Unsupervised Learning of Behavioural Patterns for Video Surveillance," The 1st International Workshop on Machine Learning for Vision-Based Motion Analysis, MLVMA, 08', 13 pages, 2008.
Retail Revealed , The Most Comprehensive In-Store Analytics, Retail Next, 29 pages, Jan. 2014.
"Search & Review Hours of Video in Minutes," Briefcam, pp. 1-5, 2019, Accessed on Jun. 25, 2019.
"Video Synopsis,® the Technology that Allows you to Review Video Fast," Briefcam, 4 pages, 2019, Accessed on Jun. 25, 2019.

\* cited by examiner

SYSTEMS AND METHODS FOR DETECTING PATTERNS WITHIN VIDEO CONTENT

TECHNICAL FIELD

The present disclosure relates generally to video management systems, and more particularly to systems and methods for detecting patterns within video content.

BACKGROUND

Known video management systems (VMS) used in security surveillance can include a plurality of cameras and workstations. The recording and storage of the video data streams in some cases, may be triggered using video motion detection (VMD). In some cases, a large percentage of the motion-triggered recordings contain unwanted motion or activity. In many cases, the unwanted motion or activity may be a weather condition, which may trigger a false alarm. In such cases, the video management system may store video clips that are not needed, and further a user may needlessly be alerted to the unwanted motion including the weather condition. As such, it may be desirable for a video management system to recognize such unwanted motion that may create false alarms, for example, thereby reducing false positives in the video management systems.

SUMMARY

The present disclosure relates generally to video management systems, and more particularly to systems and methods for detecting patterns within video content. Generally, the video management system may identify movement within a video data stream (e.g., video content) and may use pattern analytics to identify and categorize the movement within the video data stream. In some cases, the video management system may notify a user of the movement within the video data stream.

In an example, a method of processing video images in a video management system having a video camera includes receiving images from the video camera and analyzing the images to look for patterns that indicate changes between subsequent images. When a pattern indicating changes between subsequent images is detected by the video management system, the pattern is displayed for a user and the video management system solicits from the user an indication of whether the pattern indicating changes between subsequent images belongs to a true detection category or a false detection category. Patterns that belong to the false detection category are saved, so that they can be learned for identifying similar images in the future. In some cases, patterns that belong to the true detection category may also be saved, for similar reasons. Images are subsequently received from the video camera and are analyzed to look for patterns that indicate changes between subsequent images. When a pattern indicating changes between subsequent images is detected by the video management system, the pattern indicating changes between subsequent images is compared by the video management system to those patterns that were previously saved and categorized in the false detection category. When the pattern indicating changes between subsequent images is determined by the video management system to match one of the previously saved patterns categorized in the false detection category, the user is not notified. When the pattern indicating changes between subsequent images is determined by the video management system to not match one of the previously saved patterns categorized in the false detection category, the pattern indicating changes between subsequent images is displayed for the user and the video management system solicits from the user an indication of whether the pattern indicating changes between subsequent images belongs to a true detection category or a false detection category. Patterns that belong to the false detection category are saved. In some cases, patterns that belong to the true detection category may also be saved.

In one example, a method of reducing false positives in a video management system which may include a video camera, may include a learning mode and an operational mode. When in the learning mode, the method may include, the video management system receiving images from the video camera, and analyzing the images to look for patterns indicating movement or appearance of objects. When a pattern indicating movement or appearance of objects is found, the pattern may be displayed for a user, and the video management system may solicit from a user an indication of whether the pattern indicating movement or appearance of objects belongs to a true detection category or a false detection category. The method may further include saving patterns indicating movement or appearance of objects that belong to the false detection category for subsequent use when in the operational mode. In some cases, patterns that belong to the true detection category may also be saved. When subsequently in the operational mode, the video management system may receive images from the video camera and may analyze the images to look for patterns indicating movement or appearance of objects. When a pattern indicating movement or appearance of objects is detected by the video management system, the video management system may compare the pattern indicating movement to those previously categorized into the false detection category. When the pattern indicating movement or appearance of objects is determined to match a pattern in the false detection category, the video management system may not alert the user, and when the pattern indicating movement or appearance of objects is determined to not match a pattern in the false detection category, the video management system may alert the user.

In another example, a method of reducing false positives in a video management system including a video camera may include receiving a first plurality of images from a video camera, and comparing the first plurality of images to a reference image to look for pixel changes from one image to the next, which may indicate the appearance or movement of one or more objects. The method may include determining when the first plurality of images differ from the reference image in a way that indicates appearance or movement of objects, and when so may issue an alert to a user. In response, the user may classify the first plurality of images into one of two or more predefined categories. The method may include analyzing a subsequent second plurality of images to determine whether the second plurality of images differ from the reference image in a way that indicates the appearance or movement of objects, and when so determining whether the appearance or movement of objects in the second plurality of images matches the appearance or movement of objects in the first plurality of images, and may issue an alert to the user when it is determined that the appearance or movement of objects in the second plurality of images does not match the appearance or movement of objects in the first plurality of images and the user classified the first plurality of images into a first one of the predefined categories, and may not issue an alert to the user when it is determined that the appearance or movement of objects in the second plurality of images does match the appearance or movement of objects in the first plurality of images, and the user classified the first plurality of images into the first one of the predefined categories.

In another example, a system for finding anomalies in a scene may include a video camera for capturing a plurality of images of the scene, a memory which may be operatively coupled to the video camera that received the plurality of images from the video camera. The memory may store a library of previously identified patterns. A pattern analytics module may be operatively coupled to the memory, and the pattern analytics module may be configured to compare the plurality of images to the library of previously identified patterns, and may determine whether the plurality of images represent an anomaly relative to the previously identified patterns. When it is determined that the plurality of images represent an anomaly relative to the previously identified patterns, the pattern analytics module may present the plurality of images to a user for manual classification of the plurality of images into one or more predefined categories. When it is determined that the plurality of images does not represent an anomaly relative to the previously identified patterns, the pattern analytics module may automatically classify the plurality of images into a corresponding one of the predefined categories.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranged by endpoints includes all numbers subsumed within that range (e.g., 1 to 5 includes, 1, 1.5, 2, 2.75, 3, 3.8, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

The present disclosure relates generally to video management systems used in connection with surveillance systems. Video management systems may include, for example, a network connected device, network equipment, a remote monitoring station, a surveillance system deployed in a secure area, a closed circuit television (CCTV), security cameras, networked video recorders, and panel controllers. While video management systems with video processing controllers are used as an example below, it should be recognized that the concepts disclosed herein can be applied to video management systems more generally.

Figure 1:
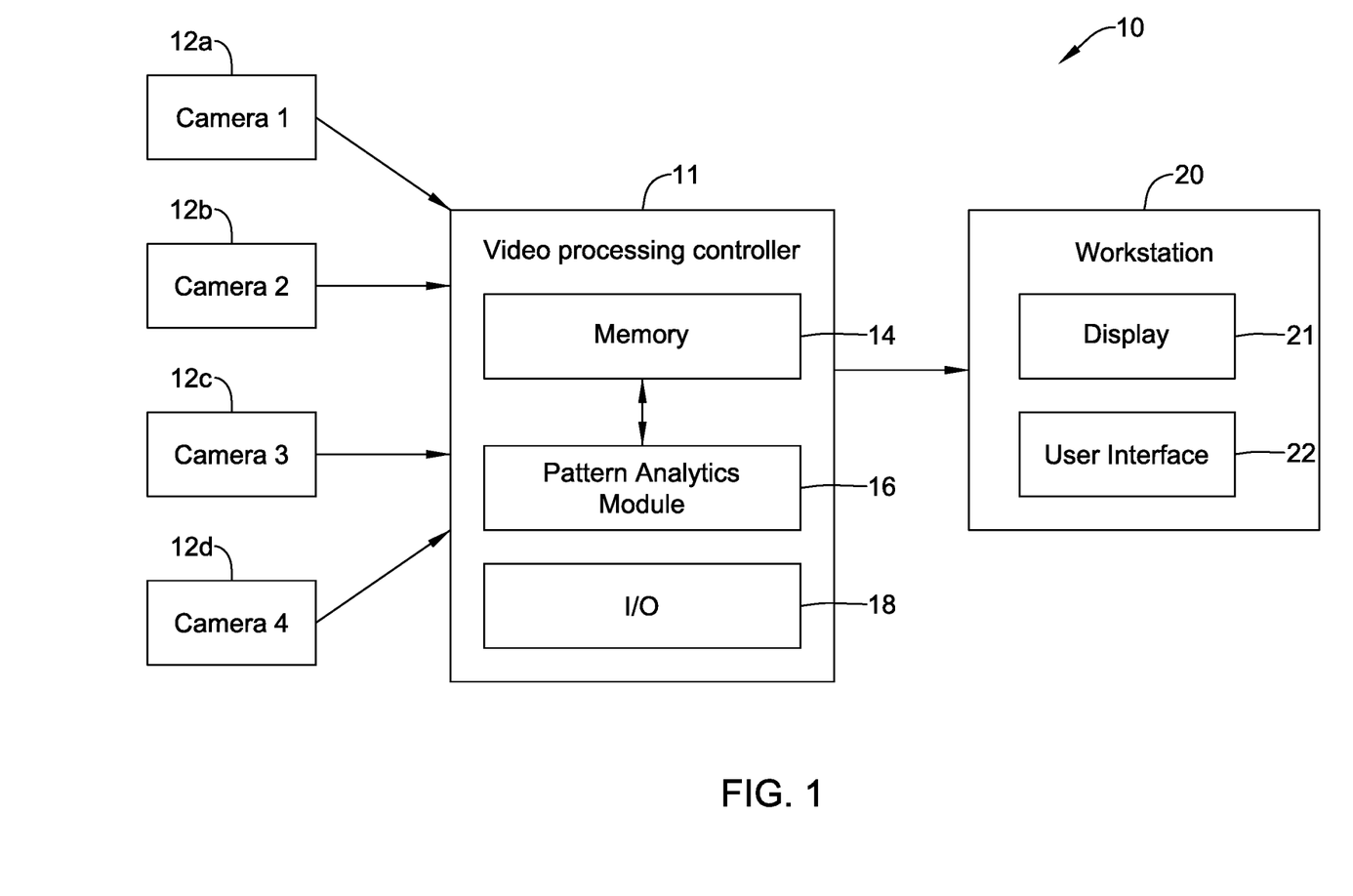
FIG. 1 is a schematic view of an illustrative video management system having a video processing controller in communication with one or more remotely located video surveillance cameras.

FIG. 1 is a schematic view of an illustrative video management system (VMS) 10 having a video processing controller 11 in communication with one or more remotely located video surveillance cameras 12a, 12b, 12c, and 11d (hereinafter generally referenced as cameras 12). While a total of four video surveillance cameras 12 are shown, it will be appreciated that this is merely illustrative, as there may be any number of video surveillance cameras 12. The video processing controller 11 may be configured to communicate with and control one or more components of the video management system 10. For example, the video processing controller 11 may communicate with the one or more components (e.g., cameras 12 and workstation 20) of the video management system 10 via a wired or wireless link (not shown). Additionally, the video processing controller 11 may communicate over one or more wired or wireless networks that may accommodate remote access and/or control of the video processing controller 11 via another device such as a smart phone, tablet, e-reader, laptop computer, personal computer, or the like. In some cases, the network may be a wireless local area network (LAN). In some cases, the network may be a wide area network or global network (WAN) including, for example, the Internet. In some cases, the wireless local area network may provide a wireless access point and/or a network host device that is separate from the video processing controller 11. In other cases, the wireless local area network may provide a wireless access point and/or a network host device that is part of the video processing controller 11. In some cases, the wireless local area network may include a local domain name server (DNS), but this is not required for all embodiments. In some cases, the wireless local area network may be an ad-hoc wireless network, but this is not required.

In some cases, the video processing controller 11 may be programmed to communicate over the network with an external web service hosted by one or more external web server(s). The video processing controller 11 may be configured to upload selected data via the network to the external web service where it may be collected and stored on the external web server. In some cases, the data may be indicative of the performance of the video management system 10. Additionally, the video processing controller 11 may be configured to receive and/or download selected data, settings and/or services sometimes including software updates from the external web service over the network. The data, settings and/or services may be received automatically from the web service, downloaded periodically in accordance with a control algorithm, and/or download in response to a user request.

Depending upon the application and/or where the video management system 10 user is located, remote access and/or control of the video processing controller 11 may be provided over a first network and/or a second network. A variety of remote wireless devices may be used to access and/or control the video processing controller 11 from a remote location (e.g., remote from the video processing controller 11) over the first network and/or the second network including, but not limited to, mobile phones including smart phones, tablet computers, laptop or personal computers, wireless network-enabled key fobs, e-readers, and/or the like. In many cases, the remote wireless devices are configured to communicate wirelessly over the first network and/or the second network with the video processing controller 11 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired. In some cases, the network may be a wide area network or global network (WAN) including, for example, the Internet. In some cases, the wireless local area network may provide a wireless access point and/or a network host device that is separate from the video processing controller 11. In other cases, the wireless local area network may provide a wireless access point and/or a network host device that is part of the video processing controller 11. In some cases, the wireless local area network may include a local domain name server (DNS), but this is not required for all embodiments. In some cases, the wireless local area network may be an ad-hoc wireless network, but this is not required.

As discussed above, the video processing controller 11 may be in communication with the one or more remotely located video surveillance cameras 12. The cameras 12 may be located along a periphery or scattered throughout an area that is being watched by the cameras 12. The cameras 12 may be controlled via a control panel that may, for example, be part of the video processing controller 11. In some instances, the control panel (not illustrated) may be distinct from the video processing controller 11. It will be appreciated that in some cases, the video processing controller 11 may be located near one or more of the cameras 12. The video processing controller 11 may be remote from the cameras 12. In some cases, the video processing controller 11 may actually be disposed within one or more of the cameras 12. The video processing controller 11 may operate under the control of one or more programs loaded from a non-transitory computer-readable, such as a memory 14. The video management system 10 may include a workstation 20, which may be used to display images provided by the cameras 12 to security personnel, for example on a display 21. The workstation 20 may be a personal computer, for example, or may be a terminal connected to a cloud-based processing system.

The workstation 20 may include a display 21 and a user interface 22. The user interface 22 may include a data input device such as a keyboard, a keypad, a joystick, a touch pad, and the like, but this is not required. In some cases, the video processing controller 11 may additionally or alternatively include a remote user interface that facilitates a user's interactions with the video processing controller 11. For example, the remote user interface may be provided by a number of portable devices (not shown), such as for example, but not limited to, remote internet devices, including a smart phone, a tablet computer, a laptop computer, or a desktop computer. In some cases, the user interface 22 may communicate with the video processing controller 11 via a router such as, for example, a Wi-Fi or Internet router. In some cases, the user interface 22 may communicate with the video processing controller 11 via a cloud (not shown).

The video processing controller 11 may be configured to receive signals from a video camera (e.g., the cameras 12) via an I/O 18 and may also receive commands or other instructions from a remote location such as the aforementioned remote devices via the I/O 18. The video processing controller 11 may be configured to output processed images to portable devices via the cloud, and/or to the workstation 20 via the I/O 18. The video processing controller 11 (e.g., a microprocessor, microcontroller, etc.), may be operatively coupled to the memory 14 and the I/O 18. As noted with respect to FIG. 1, the video processing controller 11 may be configured to receive signals from the one or more cameras (such as the cameras 12*a*, 12*b*, 12*c*, and 12*d*, as shown in FIG. 1) that is/are positioned in different spaces within an area. In some cases, the video processing controller 11 may be configured to receive a signal from the cameras 12 located throughout an area, via the one or more inputs (e.g., I/O 18). In some cases, the I/O 18 may be a wireless receiver or a wireless transceiver. The cameras 12, as shown in FIG. 1, may include closed circuit television (CCTV) hardware, such as security cameras, networked video recorders, panel controllers, and/or any other suitable camera.

The video processing controller 11 may receive one or more images from the cameras 12 and may analyze the images in order to identify any patterns indicating changes within the images. Changes within the images may, for example, indicate movement. Movement may include things that are of interest and may also include things that are not of interest. Examples of movement that are of interest may include a person walking at a time and location in which a person is not expected. An example of expected movement may be, for example, seeing a number of school buses pulling into the school parking lot shortly before school gets out for the day. Such movement may not be of interest. Another example of movement that is not of interest includes weather. In some cases, as shown, the video processing controller 11 may include a pattern analytics module 16. While discussed with respect to processing live or substantially live video feeds, it will be appreciated that stored images such as playing back video feeds, or even video clips, may be similarly processed. If a particular video clip is incorrectly characterized, the video management system 10 allows the user the opportunity to correct this.

There are a number of illustrative use cases that may be of interest for the video management system 10. In one use case, the video management system 10 may look for patterns in pixel changes. This can include, for example, amount of change, location, size and spatial distribution of the changed pixels, in both the spatial and temporal domains. As an example, a particular pattern may include video segments of heavy rain, which may manifest itself in changed pixels in streaks with moderate pixel intensity changes. Another particular pattern may include video segments of heavy snow, which may manifest itself in changed pixels in streaks with heavier pixel intensity changes. The user may be able to label these patterns as "heavy rain" and "heavy snow", respectively, as separate categories. The user may be able to combine these patterns as "extreme weather". The video management system 10 may subsequently determine that patterns that match these are to be discarded, and not stored or shown to the user.

Metadata used in this case may include: pixel changes (frame to frame difference, accumulated pixel change over a time window, or pixel value change comparing to a statistical based background model, etc.), image coordinate of the changed pixels, size/shape of the blob of changed pixels, how scattered and how spatially distributed the changed pixels are, how fast the pixel change takes place etc.

Another use case example, which would use the same metadata, pertains to identifying patterns from light flickering due to a faulty light. This may include a light flashing on and off, for example. A user may confirm that this is a true detection of something worth noticing, and therefore should be an alert so that building maintenance folks can replace the faulty light bulb.

Another use case example pertains to identifying patterns of presence and movement of people and/or specific objects in a scene that have a similar schedule, the route they take etc. —which indicates the occurrence of certain building services. Anomalies may indicate the absence of the occurrence of these regular activities, and may therefore correspond to service not being delivered. Example of patterns that the pattern analyzer can identify include but are not limited to cleaning services inside the building, such as the appearance of cleaning crew and their route going around various areas in the building. Another example is garbage collection service. Another example is a school bus or shuttle bus schedule. In some cases, the user can name each of these patterns with a user friendly name, "e.g. cleaning crew after hours", and can also select the "lack of" such service, which would result in an alert or a new event entry in the database, store the video as evidence, so that it can be raised with the service provider about service not delivered.

The metadata used here may include: people (may be dressed in uniform that the system can recognize), objects (e.g. cleaning supplies, garbage containers, garbage truck etc.) time of day, day of week, duration of stay of these people, areas (cameras) they appear in the building. These are just examples of metadata that may be used.

Another use case involves detecting potential shoplifter behavior. For example, most shoppers may exhibit patterns in how they hold their heads, how they look at the merchandise, etc. Conversely, a shoplifter may exhibit different patterns, such as how they look at the merchandise, how they possibly look around to see if their behavior has been spotted, and the like. Metadata that may be useful include person detection, face detection (and recognition), head pose detection, gaze detection, identity and counts of merchandise removed from the shelf, duration of the person's remaining in front of a particular shelf and their movement path within the store.

In some cases, metadata may be extracted from the images and/or live video streams even when pixel changes are not detected. Extracting metadata in response to detecting pixel changes that can indicate the appearance and/or movement of one or more objects is merely an example of when metadata may be extracted.

As will be discussed, the pattern analytics module 16 may play a part in analyzing images and/or live video streams in order to detect any patterns indicating movement within the images. For example, the pattern analytics module 16 may continually analyze an image captured by one or more of the cameras 12 to look for changes. In some cases, a reference image may be stored, and continuous image comparison and analysis of the images received from the cameras 12 may be performed by the pattern analytics module 16. When a difference is detected between the current captured image and the reference image, the pattern analytics module 16 may determine that an object has been detected. In some cases, the pattern analytics module 16 may analyze the image that differs from the reference image to determine if there is a pattern indicating movement. In other cases, rather than storing a reference image, the pattern analytics module 16 may be trained to identify patterns indicating movement in the captured images, often by the movement of the object, and/or other object characteristics. In either case, the pattern analytics module 16 may be configured to look for a pattern indicating movement, within the captured images and/or live video stream.

In some cases, the pattern analytics module 16 may be configured to classify one or more of the patterns indicating movement within the captured images into one of two or more predefined categories. The two or more predefined categories may include a true detection category and/or a false detection category. A true detection category, for example, may include patterns, sometimes indicating movement, that show things that the user indicates they are interested in seeing. This may, for example, be things that are out of the ordinary. People in the parking lot at 3 am may be something that would be out of the ordinary, and thus would qualify for the true detection category. The false detection category, for example, may include patterns, sometimes indicating movement, that show things that the user indicates they are not interested in seeing again. For example, video showing rain or snow falling, while demonstrating movement, may be considered by the user as providing a false positive (movement, but nothing of interest). A tree branch blowing in the wind may be another good example of a false positive that would be categorized in the false detection category. The false detection category may also include examples of people. As an example, a video may show a group of people at the coffee maker every day at 8:30 am. If this is expected, and not out of the ordinary, the user may instruct the video processing controller 11 to ignore this. When one or more patterns indicating movement falls within the true detection category, the pattern analytics module 16 may be configured to provide a notification (e.g., an alert) to a user, as discussed with reference to FIGS. 3 and 4. For example, in some cases, the patterns indicating movement may include an object such as a moving human and/or a moving animal. The pattern analytics module 16 may be configured to recognize the moving object, and thereby classify the images containing the moving object into the true detection category.

In some cases, the pattern analytics module 16 may include a filter feature, which eliminates reporting filtered objects and/or patterns indicating movement that fall within the false detection category. When one or more objects and/or patterns indicating movement fall within the false detection category, the pattern analytics module 16 may "filter out" these objects and/or patterns indicating movement so as to not provide a notification (e.g., an alert) to a user. In one example, the pattern analytics module 16 may be configured to recognize a weather condition (e.g., rain, snow, etc.), thereby classifying the images containing the weather condition into the false detection category.

Figure 2:
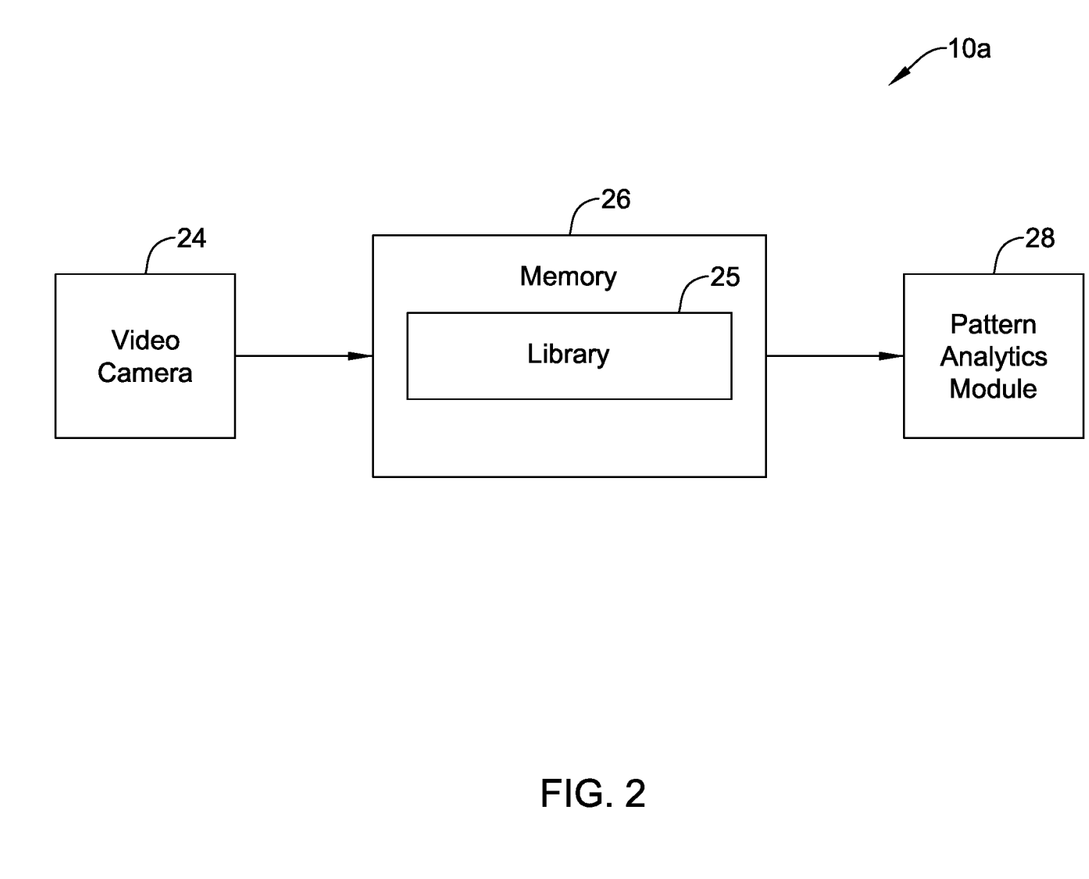
FIG. 2 is a schematic block diagram of an illustrative video management system.

FIG. 2 is a schematic block diagram of an illustrative video management system 100. In some instances, the video management system 10a may be considered as an example of the video management system 10 of FIG. 1. In some instances, the video management system 10a may include a video camera, such as camera 24 which may be operatively coupled to a memory 26. The camera 24 may be considered as an example of one of the cameras 12, for example. In some cases, the memory 26 may include a library 25 stored within the memory 26. The video management system 10a may further include a pattern analytics module 28, which may be operatively coupled to the memory 26. The pattern analytics module 28 may be considered an example of the pattern analytics module 16 of FIG. 1.

The memory 26 may temporarily store one or more images received from the camera 24. The memory 26 may also store software that is used to provide the functionality of the pattern analytics module 28. The memory 26 may be any suitable type of storage device including, but not limited to, RAM, ROM, EPROM, flash memory, a hard drive, and/or the like. As discussed, the memory 24 may include the library 25. The library 25 may include previously identified patterns indicating movement. For example, in some instances, the library 25 may store patterns indicating movement that fall within the true detection category and/or the false detection category. As previously discussed with reference to FIG. 1, the true detection category may include patterns that a user may be interested in seeing. For example, the true detection category may include people in the parking lot at 3:00 am. In other examples, the true detection category may include a person shoplifting, a delivery truck delivering goods, clips of blacklisted persons, etc. The false detection category may include patterns that a user may not be interested in seeing. For example, the false detection category may include a video showing rain or snow falling, a tree branch blowing in the wind, expected movements of people within a space (e.g., a group of people in a lunch room at noon), etc. Having the patterns indicating movement that fall within the true detection category and/or the false detection category stored in the library 25 may reduce false positives in the video management system (e.g., video management system 10, video management system 10a). For example, the pattern analytics module 28 may be configured to compare a video stream to stored images within the library 25 and automatically classify the video stream into one of the true detection category or the false detection category. In some cases, when images are classified into the true detection category, the pattern analytics module may be configured to alert the user. In other cases, when the images are classified into the false detection category, the pattern analytics module may not be configured to alert the user.

Figure 3:
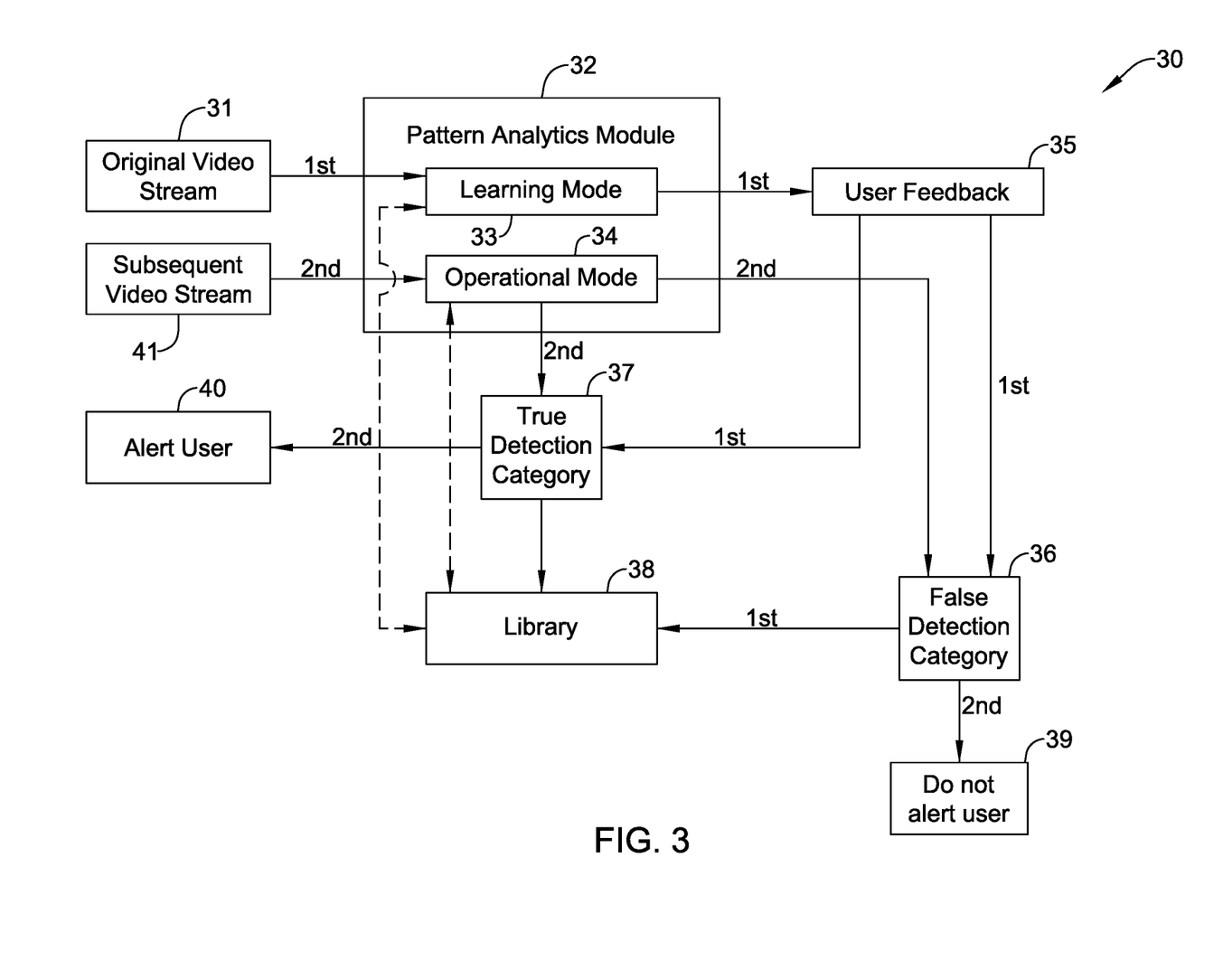
FIG. 3 is a schematic block diagram showing an illustrative method for reducing false positives in the video management system.

FIG. 3 is a schematic block diagram showing an illustrative method 30 for reducing false positives in the video management system 10, wherein the video management system 10 receives video content received from a video source (e.g., cameras 12). A video processing controller (e.g., the video processing controller 11 as shown in FIG. 1) may receive an original video stream 31. The original video stream 31 may be received by the video processing controller 11 from a video surveillance camera (e.g., the cameras 12 as shown in FIG. 1), which may be disposed within an area. The original video stream 31 may include an image, a plurality of images, and/or a series of images. The original video stream 31 may alternatively be a stored video or a video clip. The original video stream 31 may alternatively or additionally include one or more static images. In some cases, the video processing controller may pass the original video stream 31 through a pattern analytics module 32. The pattern analytics module 32 may include a learning mode 33 and an operational mode 34. The original video stream 31 may be passed through the learning mode 33 within the pattern analytics module 32. When in the learning mode 33, the original video stream 31 (e.g., an image or a series of images) may be analyzed to look for patterns indicating movement. For example, in some cases, analyzing the original video stream 31 may include comparing the original video stream 31 to a reference image and analyzing the original video stream 31 to determine if there are any differences between the original video stream 31 and the reference image. In some cases, when an image of the original video stream 31 differs from the reference image, a determination is made that there is a pattern indicating movement. In other cases, when the original video stream 31 includes a series of images, the series of images may be analyzed to look for changes in a particular image within the series of images relative to a previous image in the series of images. In this case, when changes are found in two or more sequential images, a determination is made that there is a pattern indicating movement.

In some cases, the pattern analytics module 32 may identify pixels that represent a moving object. In some cases, the pattern analytics module 32 may perform facial recognition, motion trajectory analysis, vehicle analysis, scene classification, and/or the like. For example, the pattern analytics module 32 may recognize a weather condition (e.g., rain or snow), by recognizing changes in pixels between sequential images. In some cases, the pattern analytics module 32 may analyze motion and trajectory of recognized objects (e.g., a person, a vehicle, etc.) and identify a regular, recurring pattern (e.g., an expected movement) based on a time of the event. When the known, recurring pattern deviates from the normal time of the event, and an unexpected moving object is detected, the pattern analytics module 16 may determine an anomaly within the scene has occurred. In one example, the pattern analytics module 32 may identify a scene (e.g., images within the original video stream 31) which is too crowded, such as, for example, too many people in a particular area at a particular time of day and/or too many vehicles in an area at an odd time.

As can be seen, when in the learning mode 33, the original video stream 31 containing a pattern indicating movement, an expected or unexpected moving object, and/or an anomaly, may be passed to block 35 in which user feedback is solicited from a user. The pattern analytics module 32 may be configured to learn, over time, patterns that are of interest to the user based on the feedback provided by the user. The pattern analytics module 32 may also learn, over time, patterns that are not of interest to the user. At block 35, the original video stream 31 containing a pattern indicating movement, an expected or unexpected moving object, and/or an anomaly, may be displayed to a user on a display (e.g., display 21 of FIG. 1). The user may view the original video stream 31 containing a pattern indicating movement, an expected or unexpected moving object, and/or an anomaly, and the user may provide feedback which may include classifying the pattern indicating movement, the expected or unexpected moving object, and/or the anomaly into one of two or more predefined categories. For example, the user may classify the images received from the pattern analytics module 32 into one of a false detection category 36 or a true detection category 37. In one example, the user may classify an image containing a weather condition in the false detection category 36. In another example, the user may classify an image containing an expected moving object in the false detection category 36. Images and/or patterns indicating movement that are classified in the false detection category 36 may then be saved in a library 38 for subsequent use when in the operational mode 34. The library 38 may be stored in a memory (e.g., the memory 14 of FIG. 1), which may be accessed by the pattern analytics module 32 when in the operational mode 34. In another example, the user may classify an image containing an unexpected moving object in the true detection category 37. Images and/or patterns indicating movement that are classified in the true detection category 37 may then be saved in the library 38 for subsequent use when in the operational mode 34. The images and/or patterns indicating movement that are stored in the library (e.g., the memory) may be stored for a period of time that is dependent of the category to which the images and/or patterns indicating movement were classified.

In some examples, a user may be presented with patterns indicating movement, expected or unexpected moving objects, and/or anomalies such as, weather conditions, lights flickering, unusually crowded spaces, unusual trajectory of moving objects, clips of shoppers, clips of specific individuals, clips of vehicles, clips of a specific violation, and/or the like. These are just examples.

As shown in FIG. 3, a subsequent video stream 41 may be passed through the operational mode 34 of the pattern analytics module 32. When in the operational mode 34, the subsequent video stream 41 may be analyzed to look for a pattern indicating movement, an expected or an unexpected moving object, and/or an anomaly. When the subsequent video stream 41 is determined to contain images including a pattern indicating movement, an expected or an unexpected moving object, and/or an anomaly, the images may be compared to the stored library 38 to determine whether the images containing a pattern indicating movement, an expected or an unexpected moving object, and/or an anomaly match a pattern stored in the false detection category 36 within the library 38. In some cases, when it is determined that the images containing a pattern indicating movement, an expected or an unexpected moving object, and/or an anomaly do match a pattern stored in the false detection category 36 within the library 38, the video management system 10 does not alert a user, as indicated at block 39. In some cases, when the images containing a pattern indicating movement, an expected or an unexpected moving object, and/or an anomaly are determined not to match a pattern stored in the false detection category 36 within the library 38, the video management system sends an alert to the user, at block 40. In some cases when the images containing a pattern indicating movement, an expected or an unexpected moving object, and/or an anomaly are determined to match a pattern stored in the true detection category 37, the video management system 10 may automatically alert a user, as indicated at block 40.

Figure 4:
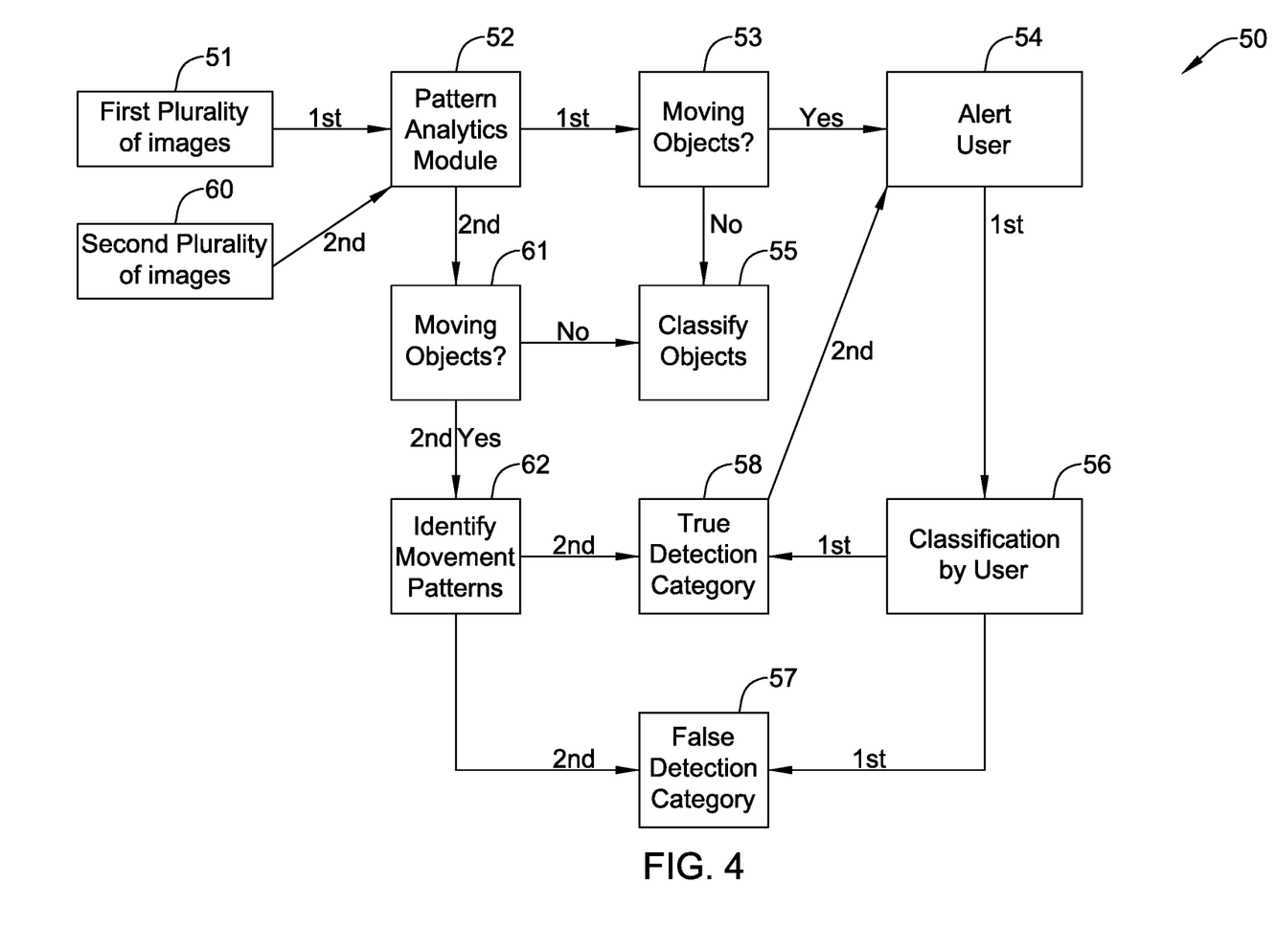
FIG. 4 is a schematic block diagram showing an illustrative method for reducing false positives in the video management system.

FIG. 4 is a schematic block diagram showing an illustrative method 50 for reducing false positives in the video management system 10. Similar to the method of FIG. 3, a video processing controller (e.g., the video processing controller 11 as shown in FIG. 1) may receive a first plurality of images 51. The first plurality of images 51 may be received by the video processing controller from a video surveillance camera (e.g., the cameras 12 as shown in FIG. 1), which may be disposed within an area. The first plurality of images 51 may include an image, a plurality of images, and/or a series of images. The first plurality of images 51 may alternatively be a stored video or a video clip. The first plurality of images 51 may also be one or more static images. In some cases, the video processing controller may pass the first plurality of images 51 through a pattern analytics module 52. The pattern analytics module 52 may analyze the first plurality of images 51 by comparing the first plurality of images 51 to a reference image, and analyzing the first plurality of images 51 to determine if the first plurality of images 51 differs from a reference image in a way that indicates movement of objects, as indicated by block 53. When it is determined that the first plurality of images 51 includes moving objects, the video management system 10 alerts a user, as indicated by block 54. When it is determined that the first plurality of images 51 does not include moving objects, the video management system 10 classifies any non-moving objects, as indicated at block 55, and in some cases may not notify or otherwise alert the user.

When the user has received the alert, the user may view the first plurality of images 51 containing moving objects (e.g., a pattern indicating movement, an expected or unexpected moving object, and/or an anomaly), and the user may provide feedback which may include classifying the moving objects into one of two or more predefined categories, as indicated by block 56. For example, the user may classify the images received from the pattern analytics module 52 into one of a false detection category 57 or a true detection category 58. In some cases, the images that have been classified in the false detection category 57 and/or the true detection category 58, may be stored in a library (e.g., library 150 in FIG. 2).

As shown in FIG. 4, a second plurality of images 60 may be passed through the pattern analytics module 52. The pattern analytics module 52 may analyze the second plurality of images 60 to determine if the second plurality of images 60 differs from a reference image in a way that indicates movement of objects, as indicated by block 61. When it is determined that the second plurality of images 60 includes movement of objects, the movement of the objects is analyzed to determine whether the movement of objects in the second plurality of images 60 matches the movement of objects in the first plurality of images 51. For example, when it is determined that the movement of objects in the second plurality of images 60 does not match the movement of objects in the first plurality of images 51, the second plurality of images 60 are determined to fall within the true detection category 58, as indicated by block 54. In another example, when it is determined that the movement of objects in the second plurality of images 60 does match the movement of objects in the first plurality of images 51, the second plurality of images 60 are determined to fall within the false detection category 57, and objects may be classified, as indicated at block 55. Alternatively, if there is a second indication of movement, movement patterns may be identified as indicated at block 62.

Figure 5A:
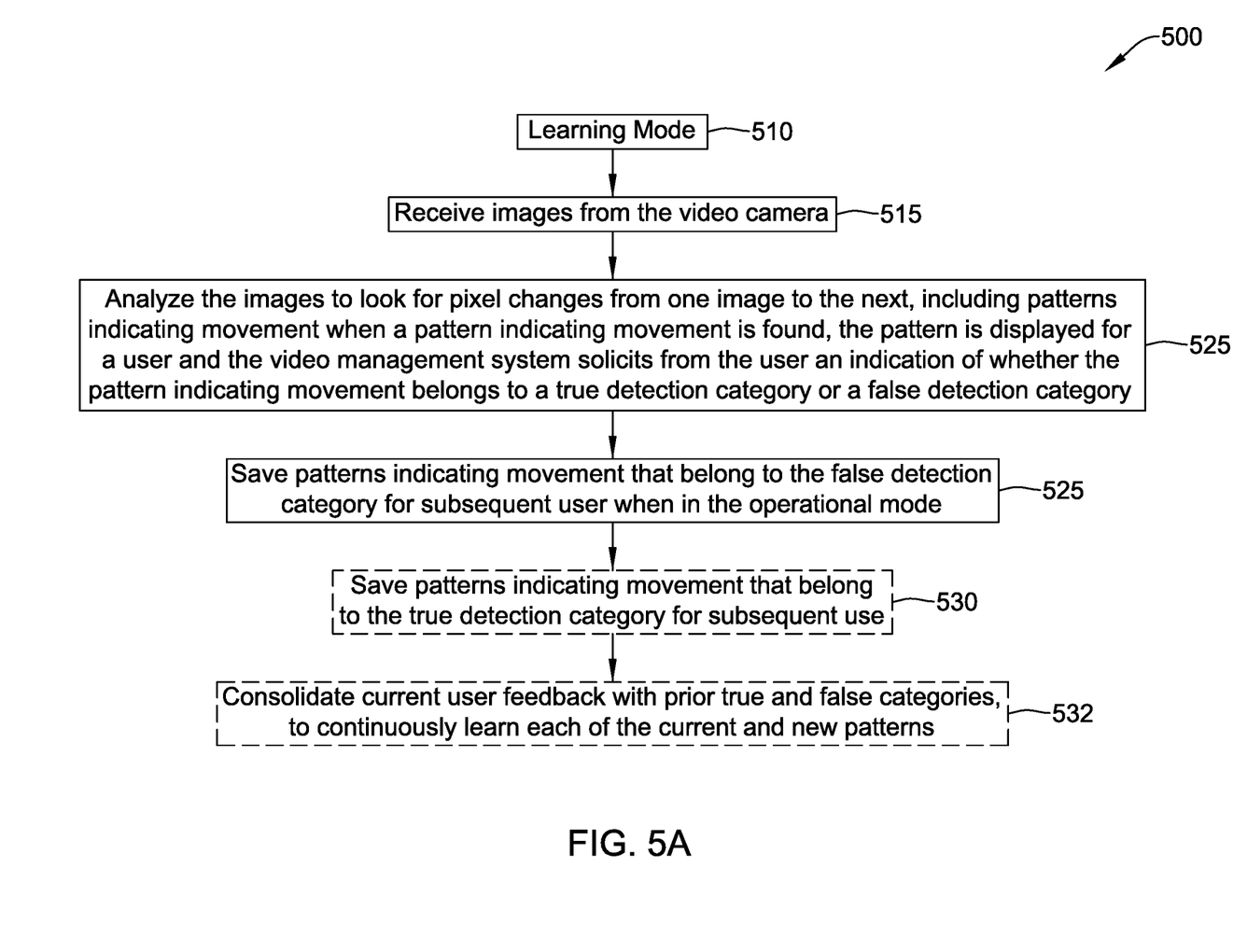
FIG. 5A is a flow diagram showing an illustrative method for reducing false positives in a video management system including a video camera.
Figure 5B:
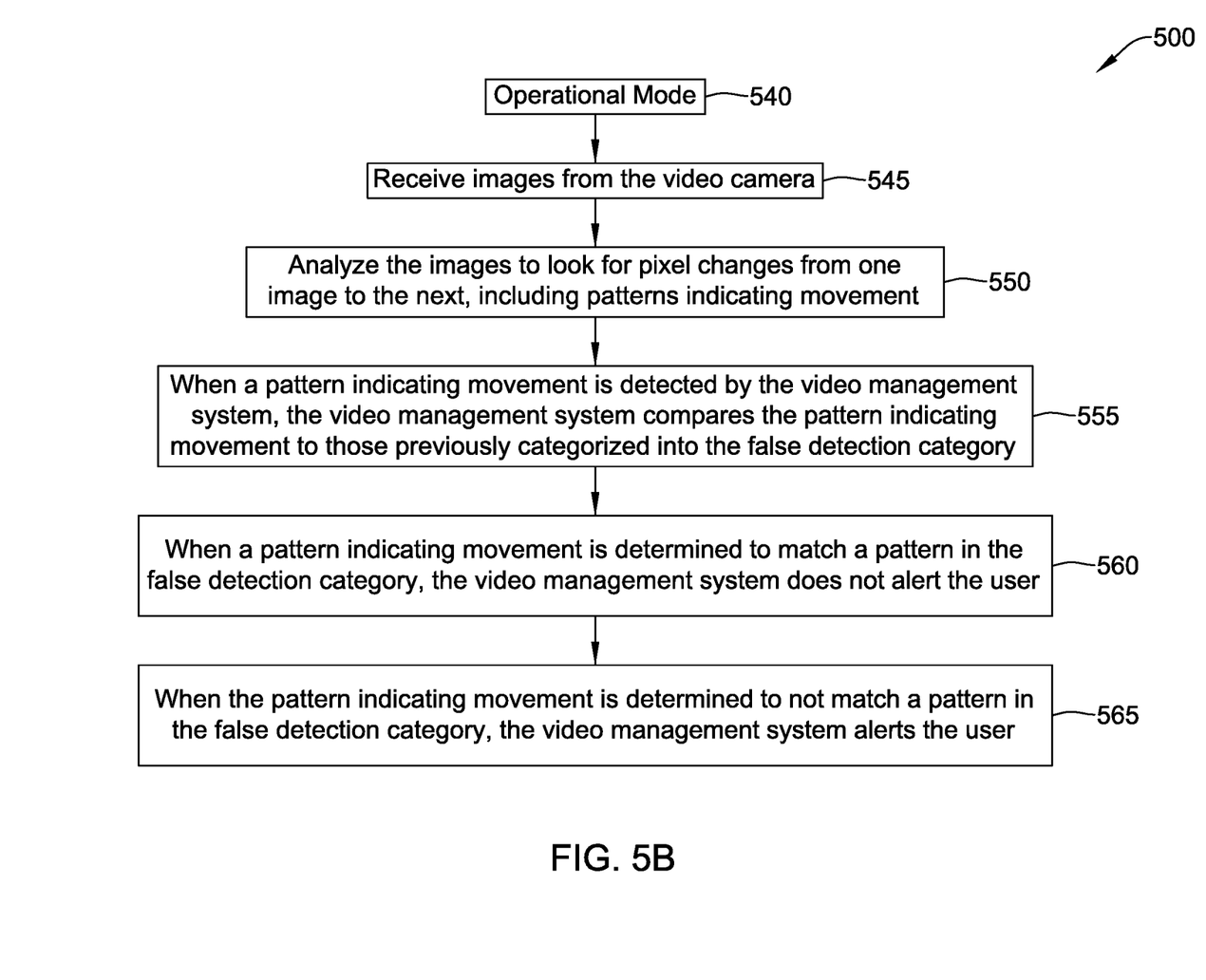
FIG. 5B is a flow diagram showing an illustrative method for reducing false positives in a video management system including a video camera.

FIGS. 5A-5B are flow diagrams showing an illustrative method 500 for reducing false positives in a video management system including a video camera. The method 500 may include a learning mode 510 (see FIG. 5A) and an operational mode 540 (see FIG. 5B). When in the learning mode 510, the video management system may receive images from the video camera, as referenced at block 515. The images received from the video camera may include a plurality of video clips, a live video stream, static images, and/or the like. The video management system may analyze the images to look for pixel changes from one image to the next, including patterns indicating movement, and when a pattern indicating movement is found, the pattern may be displayed for a user. The video management system may solicit, from the user, an indication of whether the pattern indicating movement belongs to a true detection category or a false detection category, as referenced by block 520. While in the learning mode 510, analyzing the images to look for patterns indicating movement may include comparing the images to a reference image. The images may further me analyzed to determine whether the images differ from the reference image, and when the images differ from the reference image, a determination may be made that there is a pattern indicating movement. In some cases, while in the learning mode 510, analyzing the images to look for patterns indicating movement may include analyzing a series of images captured by the video camera to look for changes in a particular image in the series of images relative to a previous image in the series of images. When changes are found in two or more sequential images, a determination is made that there is a pattern indicating movement. The video management system may save the patterns indicating movement that belong to the false detection category for subsequent use (e.g., when in the operational mode 540), as referenced by block 525. In some examples, the false detection category may include a weather condition and/or an expected movement of an object. In some cases, the video management system may save the patterns indicating movement that belong to the true detection category for subsequent use (e.g., when in the operational mode 540), as referenced by dashed line block 530. In some examples, the true detection category may include an unexpected moving object. In some cases, the pattern indicating movement that may fall within the false detection category and/or the true detection category may include a moving human. In some cases, the video management system may consolidate current user feedback with prior true and false categories in order to continuously learn each of the current and new patterns, for example.

Subsequent to the learning mode 510, the method may include the operational mode 540. When in the operational mode 540, the video management system may receive images from the video camera, as referenced by block 545. The video management system may analyze the images to look for pixel changes from one image to the next, including patterns indicating movement, as referenced by block 550. In some cases, when a pattern indicating movement is detected by the video management system, the video management system may compare the pattern indicating movement to those previously categorized into the false detection category, as referenced by block 555. In some cases, when a pattern indicating movement is detected by the video management system, the video management system may compare the pattern indicating movement to those previously categorized into the true detection category. When the pattern indicating movement is determined to match a pattern in the false detection category, the video management system may not alert the user, as referenced by block 560, and in some cases, when the pattern indicating movement is determined not to match a pattern in the false detection category, the video management system may alert the user, as referenced by block 565. When the pattern indicating movement is determined to match a pattern indicating movement saved in the true detection category, the video management system may automatically alert the user.

Figure 6:
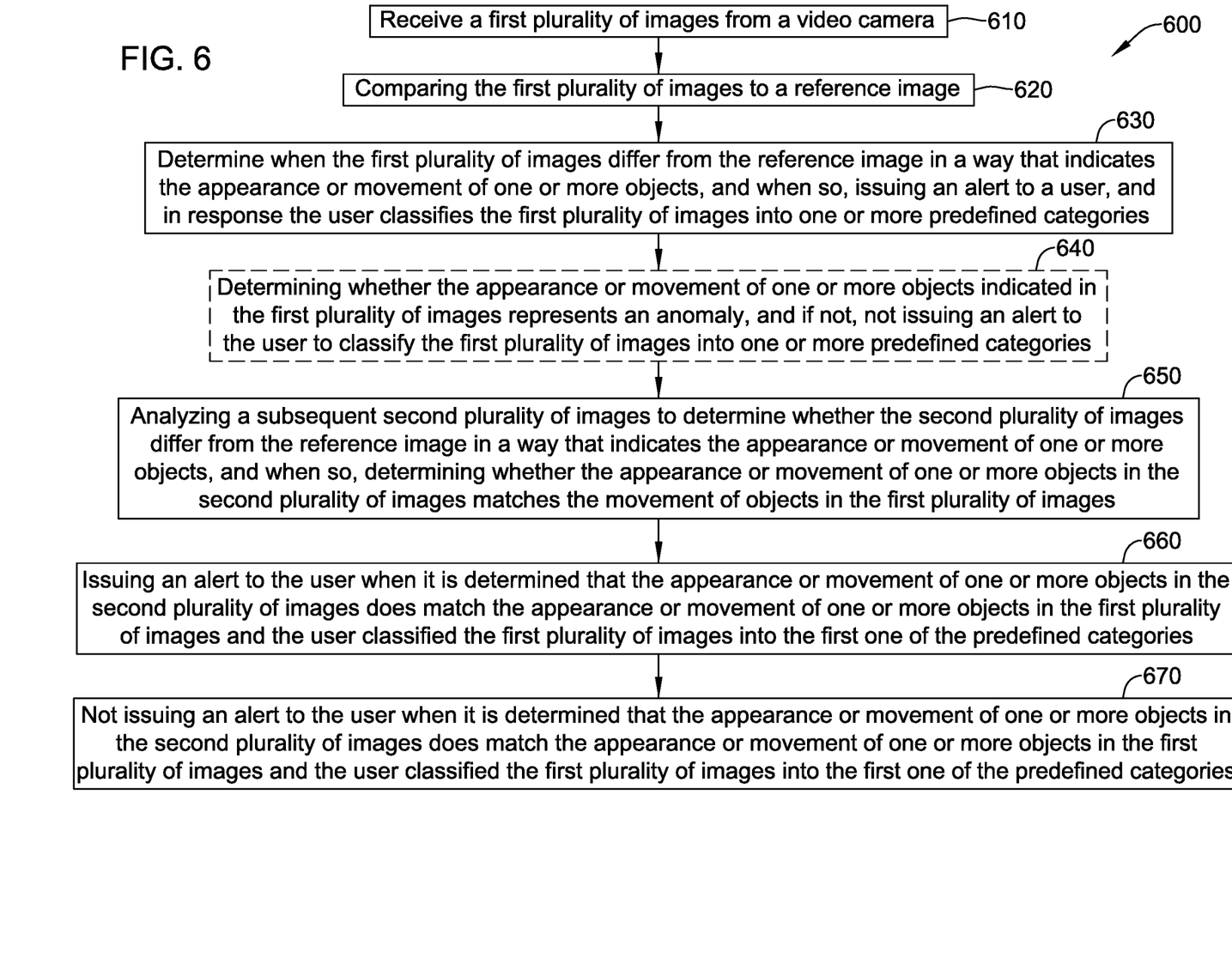
FIG. 6 is a flow diagram showing an illustrative method for reducing false positives in a video management system including a video camera.

FIG. 6 is a flow diagram showing an illustrative method 600 for reducing false positives in a video management system including a video camera. The method 600 may include receiving a first plurality of images from a video camera, as referenced by block 610, and the first plurality of images may be compared to a reference image, as referenced by block 620. The images received from the video camera may include a plurality of video clips, a live video stream, static images, and/or the like. The method 600 may include determining when the first plurality of images differ from the reference image in a way that indicates appearance or movement of objects, and when so, issuing an alert to a user. In response, the user may classify the first plurality of images into one of two or more predefined categories, as referenced by block 630. The two or more predefined categories may include a false detection category and a true detection category. In some cases, the method 600 may include the video management system determining whether the appearance or movement of objects indicated in the first plurality of images represents an anomaly, and if not, the video management system may not issue an alert to the user to classify the first plurality of images into one of two or more predefined categories, as referenced by dashed line block 640.

The method 600 may further include analyzing a subsequent second plurality of images to determine whether the second plurality of images differ from the reference image in a way that indicates appearance or movement of objects, and when so, may determine whether the appearance or movement of objects in the second plurality of images matches the appearance or movement of objects in the first plurality of images, as referenced by block 650. In some cases, the video management system may issue an alert to the user when it is determined that the appearance or movement of objects in the second plurality of images does not match the appearance or movement of objects in the first plurality of images, and the user classified the first plurality of images into a first one of the predefined categories, as referenced by block 660. For example, the first one of the predefined categories may be the false detection category. In this case, the video management system may alert the user as the appearance or movement of objects in the second plurality of images is not within the false detection category. In some cases, the video management system may not issue an alert to the user when it is determined that the appearance or movement of objects in the second plurality of images does match the appearance or movement of objects in the first plurality of images, and the user classified the first plurality of images into the first one of the predefined categories (e.g., the false detection category). In some cases, the second plurality of images may be classified in the true detection category. In this case, the video management system may issue an alert the user.

Additional Examples

Example 1. A method of reducing false positives in a video management system including a video camera, the method including a learning mode and an operational mode, the method comprising:
when in the learning mode, the video management system:
receives images from the video camera;
analyzes the images to look for patterns indicating movement;
when a pattern indicating movement is found, the pattern is displayed for a user and the video management system solicits from the user an indication of whether the pattern indicating movement belongs to a true detection category or a false detection category;
saving patterns indicating movement that belong to the false detection category for subsequent use when in the operational mode;
when subsequently in the operational mode, the video management system:
receives images from the video camera;
analyzes the images to look for patterns indicating movement;
when a pattern indicating movement is detected by the video management system, the video management system compares the pattern indicating movement to those previously categorized into the false detection category;
when the pattern indicating movement is determined to match a pattern in the false detection category, the video management system does not alert the user; and
when the pattern indicating movement is determined to not match a pattern in the false detection category, the video management system alerts the user.

Example 2. The method of example 1, further comprising when in the learning mode, saving patterns indicating movement that belong to the true detection category for subsequent use.

Example 3. The method of example 2, wherein when a pattern indicating movement is found during the operational mode, and matches a pattern indicating movement saved in the true detection category, automatically alerting the user.

Example 4. The method of example 2, wherein the true detection category includes an unexpected moving object.

Example 5. The method of example 1, wherein analyzing the images to look for patterns indicating movement while in the learning mode includes:
comparing the images to a reference image;
analyzing the images to determine whether the images differs from the reference image;
and
when the images differ from the reference image, a determination is made that there is a pattern indicating movement.

Example 6. The method of example 1, wherein analyzing the images to look for patterns indicating movement while in the learning mode includes:
analyzing a series of images captured by the video camera to look for changes in a particular image in the series of images relative to a previous image in the series of images; and
when changes are found in two or more sequential images, a determination is made that there is a pattern indicating movement.

Example 7. The method of example 1, further comprising identifying, within the pattern indicating movement, a moving human.

Example 8. The method of example 1, wherein the false detection category includes a weather condition.

Example 9. The method of example 1, wherein the false detection category includes an expected movement of an object.

Example 10. The method of example 1, wherein the images are one of a plurality of video clips or a live video stream.

Example 11. A method of reducing false positives in a video management system including a video camera, the method comprising:
receiving a first plurality of images from a video camera;
comparing the first plurality of images to a reference image;
determining when the first plurality of images differ from the reference image in a way that indicates movement of objects, and when so, issuing an alert to a user, and in response the user classifies the first plurality of images into one of two or more predefined categories;
analyzing a subsequent second plurality of images to determine whether the second plurality of images differ from the reference image in a way that indicates movement of objects, and when so, determining whether the movement of objects in the second plurality of images matches the movement of objects in the first plurality of images;
issuing an alert to the user when it is determined that the movement of objects in the second plurality of images does not match the movement of objects in the first plurality of images and the user classified the first plurality of images into a first one of the predefined categories; and
not issuing an alert to the user when it is determined that the movement of objects in the second plurality of images does match the movement of objects in the first plurality of images and the user classified the first plurality of images into the first one of the predefined categories.

Example 12. The method of example 11, wherein the two or more predefined categories includes one of a false detection category and a true detection category, wherein the first one of the predefined categories is the false detection category.

Example 13. The method of example 12, further comprising classifying the second plurality of images in the true detection category.

Example 14. The method of example 12, further comprising determining whether the movement of objects indicated in the first plurality of images represents an anomaly, and if not, not issuing an alert to the user to classify the first plurality of images into one of two or more predefined categories.

Example 15. The method of example 11, wherein the plurality images is one of a plurality of video clips or a live video stream.

Example 16. A system for finding anomalies in a scene, comprising:
a video camera for capturing a plurality of images of the scene;
a memory operatively coupled to the video camera that receives the plurality of images from the video camera, the memory stores a library of previously identified patterns;
a pattern analytics module operatively coupled to the memory, the pattern analytics module configured to:
compare the plurality of images to the library of previously identified patterns;

determine whether the plurality of images represent an anomaly relative to the previously identified patterns;

when it is determined that the plurality of images represent an anomaly relative to the previously identified patterns, present the plurality of images to a user for manual classification of the plurality of images into one of two or more predefined categories; and when it is determined that the plurality of images do not represent an anomaly relative to the previously identified patterns, automatically classify the plurality of images into a corresponding one of the two or more predefined categories.

Example 17. The system of example 16, wherein the two or more predefined categories include to a true detection category and a false detection category, wherein when the plurality of images do not represent an anomaly relative to the previously identified patterns and are automatically classified into the false detection category, no alert is issued to the user.

Example 18. The system of example 17, wherein when the plurality of images do not represent an anomaly relative to the previously identified patterns and are automatically classified into the true detection category, an alert is issued to the user.

Example 19. The system of example 16, wherein the pattern analytics module is configured to learn over time patterns that are of interest to the user.

Example 20. The system of example 16, wherein the pattern analytics module is configured to store the plurality of images in the memory for a period of time that is dependent on the predefined category to which the plurality of images were classified.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method of processing video images in a video management system including a video camera, the method comprising:

receiving images from the video camera;

analyzing the images to look for patterns that indicate changes between successive images;

when a pattern indicating changes between successive images is detected by the video management system, the pattern is displayed for a user and the video management system solicits from the user an indication of whether the pattern indicating changes between successive images belongs to a true detection category or a false detection category;

saving patterns that belong to the false detection category;

subsequently receiving images from the video camera;

analyzing the images to look for patterns that indicate changes between successive images;

when a pattern indicating changes between successive images is detected by the video management system, the pattern indicating changes between successive images is compared by the video management system to those patterns that were previously saved and categorized in the false detection category;

when the pattern indicating changes between successive images is determined by the video management system to match one of the previously saved patterns categorized in the false detection category, not notifying the user;

when the pattern indicating changes between successive images is determined by the video management system to not match one of the previously saved patterns categorized in the false detection category, the pattern indicating changes between successive images is displayed for the user and the video management system solicits from the user an indication of whether the pattern indicating changes between successive images belongs to a true detection category or a false detection category; and saving patterns that belong to the false detection category.

2. The method of claim 1, further comprising saving patterns indicating changes between successive images that are indicated by the user as belonging to the true detection category for subsequent use.

3. The method of claim 2, wherein when a pattern indicating changes between successive images is found that matches a pattern indicating changes in the images saved in the true detection category, automatically alerting the user.

4. The method of claim 2, wherein the true detection category includes an unexpected moving object.

5. The method of claim 1, wherein analyzing the images to look for patterns indicating changes between successive images includes:

comparing the images to a reference image;

analyzing the images to determine whether the images differs from the reference image; and when the images differ from the reference image, a determination is made that there is a pattern indicating changes between successive images.

6. The method of claim 1, wherein analyzing the images to look for patterns indicating changes between successive images includes:

analyzing a series of images captured by the video camera to look for changes in a particular image in the series of images relative to a previous image in the series of images; and when changes are found in two or more sequential images, a determination is made that there is a pattern indicating changes between successive images.

7. The method of claim 1, further comprising identifying a human.

8. The method of claim 1, wherein the false detection category includes a weather condition.

9. The method of claim 1, wherein the false detection category includes an expected movement of an object or a person.

10. The method of claim 1, wherein the images are one of a plurality of video clips or a live video stream.

11. A method of reducing false positives in a video management system including a video camera, the method comprising:

receiving a first plurality of images from a video camera;

comparing the first plurality of images to a reference image;

determining when the first plurality of images differ from the reference image in a way that indicates movement or presence of objects, and when so, issuing an alert to a user, and in response the user classifies the first plurality of images into one of two or more predefined categories;

analyzing a subsequent second plurality of images to determine whether the second plurality of images differ from the reference image in a way that indicates movement or presence of objects, and when so, determining whether the movement or presence of objects in the second plurality of images matches the movement or presence of objects in the first plurality of images;

issuing an alert to the user when it is determined that the movement or presence of objects in the second plurality of images does not match the movement or presence of objects in the first plurality of images and the user classified the first plurality of images into a first one of the predefined categories; and not issuing an alert to the user when it is determined that the movement or presence of objects in the second plurality of images does match the movement or presence of objects in the first plurality of images and the user classified the first plurality of images into the first one of the predefined categories.

12. The method of claim 11, wherein the two or more predefined categories includes one of a false detection category and a true detection category, wherein the first one of the predefined categories is the false detection category.

13. The method of claim 12, further comprising classifying the second plurality of images in the true detection category.

14. The method of claim 12, further comprising determining whether the movement or presence of objects indicated in the first plurality of images represents an anomaly, and if not, not issuing an alert to the user to classify the first plurality of images into one of two or more predefined categories.

15. The method of claim 11, wherein the plurality images is one of a plurality of video clips or a live video stream.

16. A system for finding anomalies in a scene, comprising:
a video camera for capturing a plurality of images of the scene;
a memory operatively coupled to the video camera that receives the plurality of images from the video camera, the memory stores a library of previously identified patterns;
a pattern analytics module operatively coupled to the memory, the pattern analytics module configured to:
compare the plurality of images to the library of previously identified patterns;
determine whether the plurality of images represent an anomaly relative to the previously identified patterns;
when it is determined that the plurality of images represent an anomaly relative to the previously identified patterns, present the plurality of images to a user for manual classification of the plurality of images into one of two or more predefined categories; and
when it is determined that the plurality of images do not represent an anomaly relative to the previously identified patterns, automatically classify the plurality of images into a corresponding one of the two or more predefined categories.

17. The system of claim 16, wherein the two or more predefined categories include a true detection category and a false detection category, wherein when the plurality of images do not represent an anomaly relative to the previously identified patterns and are automatically classified into the false detection category, no alert is issued to the user.

18. The system of claim 17, wherein when the plurality of images do not represent an anomaly relative to the previously identified patterns and are automatically classified into the true detection category, an alert is issued to the user.

19. The system of claim 16, wherein over time, the pattern analytics module is configured to learn and remember patterns that are of interest to the user.

20. The system of claim 16, wherein the pattern analytics module is configured to store the plurality of images in the memory for a period of time that is dependent on the predefined category to which the plurality of images were classified.

* * * * *